U S 010969620B2

United States Patent
Aruga et al.

(10) Patent No.: US 10,969,620 B2
(45) Date of Patent: Apr. 6, 2021

(54) IMAGE DISPLAY DEVICE

(71) Applicant: PANASONIC INTELLECTUAL PROPERTY MANAGEMENT CO., LTD., Osaka (JP)

(72) Inventors: Shigeru Aruga, Osaka (JP); Ryouta Nakayama, Osaka (JP); Chiharu Matsukawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/648,182

(22) PCT Filed: Jun. 25, 2018

(86) PCT No.: PCT/JP2018/023926
§ 371 (c)(1),
(2) Date: Mar. 17, 2020

(87) PCT Pub. No.: WO2019/058683
PCT Pub. Date: Mar. 28, 2019

(65) Prior Publication Data
US 2020/0264473 A1   Aug. 20, 2020

(30) Foreign Application Priority Data
Sep. 21, 2017   (JP) .............................. JP2017-181833

(51) Int. Cl.
*G02F 1/1335* (2006.01)
*F21V 8/00* (2006.01)
(Continued)

(52) U.S. Cl.
CPC ..... *G02F 1/133524* (2013.01); *G02B 6/0073* (2013.01); *G02F 1/133308* (2013.01);
(Continued)

(58) Field of Classification Search
CPC ......... G02F 1/133524; G02F 1/133308; G02F 1/133603; G02F 2001/133317; G02F 2001/133628; G02B 6/0073
See application file for complete search history.

(56) References Cited

U.S. PATENT DOCUMENTS

2012/0257107 A1   10/2012  Itoh
2014/0022487 A1    1/2014  Wang et al.

FOREIGN PATENT DOCUMENTS

EP     3 076 232 A1    10/2016
JP    2009-283384 A    12/2009
(Continued)

OTHER PUBLICATIONS

International Search Report and Written Opinion dated Sep. 18, 2018 in International Patent Application No. PCT/JP2018/023926; with partial English translation.
(Continued)

*Primary Examiner* — Britt D Hanley
(74) *Attorney, Agent, or Firm* — McDermott Will and Emery LLP

(57) ABSTRACT

An image display device includes: a light guide plate which includes an front face from which light from a light source exits; a heat sink that holds the light source portion and the light guide plate; a base plate which accommodates the light source portion, the light guide plate, and the heat sink; and a frame which is fixed to a wall portion of the base plate and holds the light guide plate from front of the light guide plate. The frame includes: a main body disposed inwardly of and along the wall portion; and a holder extending from the main body. The holder holds an end portion of the light guide plate from the front of the light guide plate, and the end portion is on a side of the end face from which light emitted from the light source portion enters.

6 Claims, 9 Drawing Sheets

(51) Int. Cl.
   *G02F 1/1333* (2006.01)
   *G02F 1/13357* (2006.01)
(52) U.S. Cl.
   CPC .. *G02F 1/133603* (2013.01); *G02F 1/133317* (2021.01); *G02F 1/133628* (2021.01)

(56) References Cited

FOREIGN PATENT DOCUMENTS

| WO | 2011/080954 | 7/2011 |
| WO | 2012/169441 | 12/2012 |
| WO | 2015/068705 A1 | 5/2015 |

OTHER PUBLICATIONS

Extended European Search Report dated Aug. 17, 2020 for the corresponding European Patent Application No. 18859421.2.

IMAGE DISPLAY DEVICE

CROSS-REFERENCE OF RELATED APPLICATIONS

This application is the U.S. National Phase under 35 U.S.C. § 371 of International Patent Application No. PCT/JP2018/023926, filed on Jun. 25, 2018, which in turn claims the benefit of Japanese Application No. 2017481833, filed on Sep. 21, 2017, the entire disclosures of which applications are incorporated by reference herein.

TECHNICAL FIELD

The present disclosure relates to an image display device for displaying an image.

BACKGROUND ART

Liquid crystal displays are known as one of image display devices for displaying an image (for example, see Patent Literature (PTL) 1). These liquid crystal displays each include a back light unit which is disposed on the rear-face side of a liquid crystal cell. The back light unit includes, for example, a light guide plate, and a light source portion whose emitted light enters the light guide plate from an end face of the light guide plate. For example, PTL 1 discloses a technique relating to a light guide plate that, is large and excellent in terms of productivity.

CITATION LIST

Patent Literature

PTL 1: Japanese Unexamined Patent Application Publication No. 2009-283384

SUMMARY OF THE INVENTION

Technical Problem

The present disclosure provides an image display device that can reduce the occurrence of light leakage.

Solution to Problem

An image display device according to the present disclosure includes: a light source portion; a light guide plate in a shape of a quadrilateral, the light guide plate including an end face from which light emitted from the light source portion enters and an front face from which the light exits; a heat sink that holds the light source portion and the light guide plate; a base plate which accommodates the light source portion, the light guide plate, and the heat sink; and a frame that holds the light guide plate from front of the light guide plate in a state in which the frame is fixed to a wall portion of the base plate. The frame includes: a main body disposed inwardly of and along the wall portion; and a holder extending from the main body, the holder holding an end portion of the light guide plate from the front of the light guide plate, the end portion being on a side of the end face from which light emitted from the light source portion enters.

Advantageous Effect of Invention

An image display device according to the present disclosure can reduce the occurrence of light leakage.

DESCRIPTION OF EXEMPLARY EMBODIMENTS (Underlying Knowledge Forming Basis of Present Disclosure)

The inventors of the present application have found that conventional image display devices pose problems as follows. Conventionally, an edge-light type backlight unit to which a light source portion (for example, a light emitting diode (LED) bar) is disposed along the upper side and the lower side of a light guide plate has been employed as a back light unit for an image display device, such as a liquid crystal television receiver. The light guide plate includes resin, such as acrylic resin, and expands and contracts due to the heat from a light emitting element, etc., or a change in the environmental temperature, for example.

In such a backlight unit that includes the guide light plate capable of expanding and contracting, a mold frame holds the periphery of the guide plate to prevent the guide plate from deforming.

Figure 10:
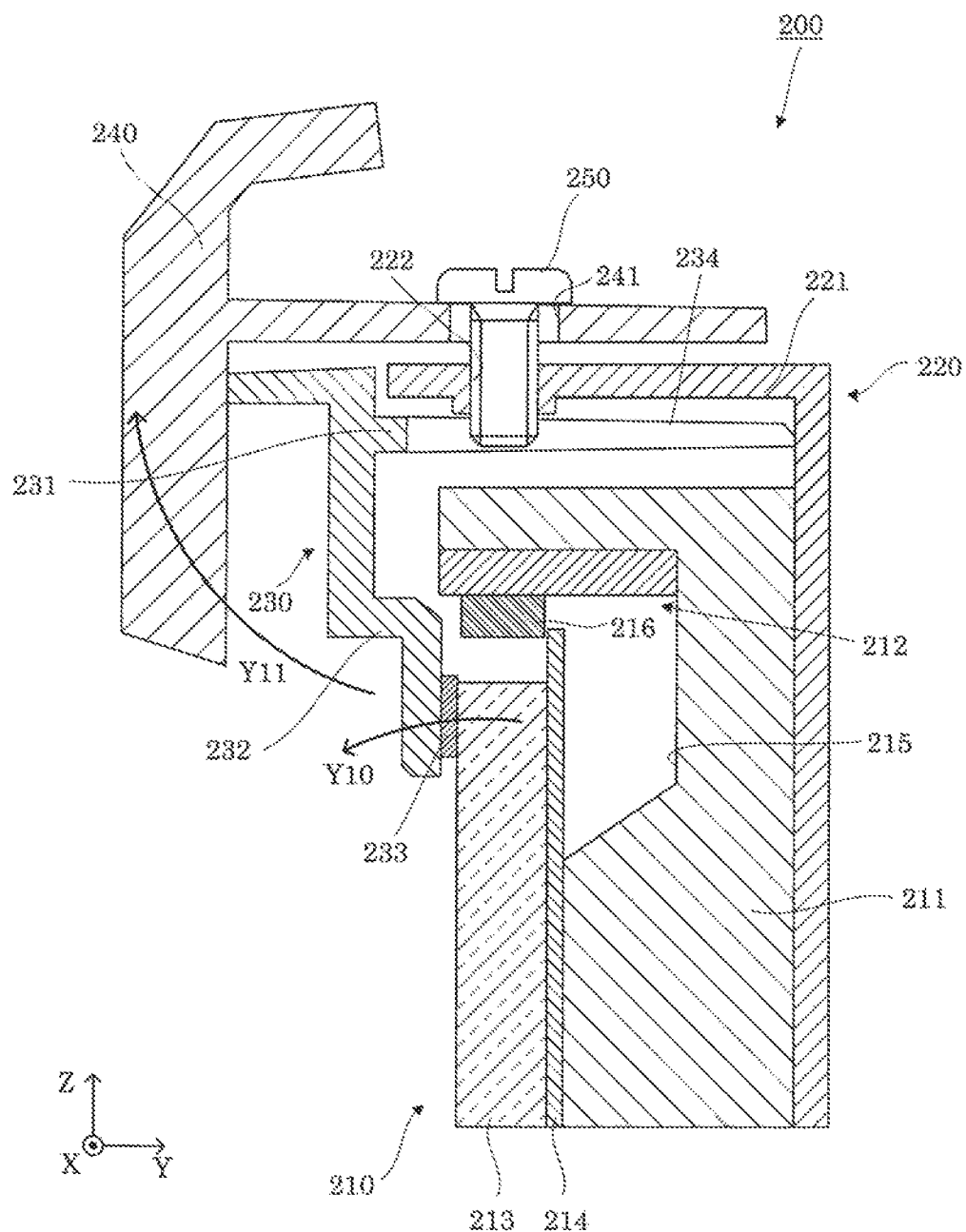
FIG. 10 is a cross sectional view illustrating a positional relationship between a conventional mold frame and a conventional light guide plate.

FIG. 10 is a cross sectional view illustrating a positional relationship between a conventional mold frame and a conventional light guide plate.

Specifically, FIG. 10 is a cross sectional view outlining the upper structure of an image display device. As illustrated in FIG. 10, image display device 200 includes backlight unit 210, rear frame 220, mold frame 230, and bezel 240.

Backlight unit 210 is an edge-light type backlight device. Backlight unit 210 includes heat sink 211, LED bar 212, light guide plate 213, and reflection sheet 214. Heat sink 211 includes metal with high thermal conductivity, and recessed portion 215 for accommodating LED bar 212 in the upper front face of heat sink 211. Light guide plate 213 is layered in front of heat sink 211 via reflection sheet 214. LED bar 212 is provided with light emitting element 216 that faces the upper end face of light guide plate 213. With this, light from light emitting element 216 enters light guide plate 213 from the upper end face of light guide plate 213, is reflected by reflection sheet 214, and exits from the front face of light guide plate 213.

Rear frame 220 is a base plate which supports backlight unit 210 from the rear face side of backlight unit 210. Rear frame 220 includes upper wall portion 221 through which screw hole 222 penetrates in the up-down direction. Bezel 240 is fastened to upper wall portion 221 with a screw that is screwed into screw hole 222.

Mold frame 230 is a long frame that holds the entirety of the upper end portion of light guide plate 213 from the front face side of light guide plate 213. Mold frame 230 includes: main body 231 disposed inwardly of and along upper wall portion 221 of rear frame 220; and holder 232 that extends from main body 231, and holds, using the end portion, the upper end portion of light guide plate 213. Cushion member 233 is provided between the end portion of holder 232 and the upper end portion of light guide plate 213. Main body 231 is provided with notch 234 for avoiding interference with screw 250 that is screwed into screw hole 222.

Bezel 240 is a frame-shaped component which covers, from the front face side, mold frame 230 and the periphery of a liquid crystal cell (not shown in the drawings) which is supported by mold frame 230. Bezel 240 includes through hole 241 coaxially formed with screw hole 222 in rear frame 220. Bezel 240 is fixed to rear frame 220 with screw 250 screwed into screw hole 222 via through hole 241.

Hereinafter, the case in which light guide plate 213 deforms due to heat from light emitting element 216, etc., or a change in the environmental temperature, for example, will be described. Specifically, the case in which the upper end portion of light guide plate 213 bends toward the arrow Y10 direction as shown in FIG. 10 due to the deformation will be described. Mold frame 230, bezel 240, and rear frame 220 have spaces between one another due to tolerances. For this reason, when the upper end portion of light guide plate 213 bends toward the arrow Y10 direction, holder 232 of mold frame 230 is pushed frontward, and thus the entirety of mold frame 230 turns toward the arrow Y11 direction. The turn of mold frame 230 is noticeable since the portion in which notch 234 is provided is particularly fragile compared with the other portions of main body 231. When mold frame 230 is turned, the upper end portion of light guide plate 213 remains deformed which results in creating a space between light guide plate 213 and reflection sheet 214. Light that leaks from the space will be a cause of luminance irregularity.

In order to prevent mold frame 230 from turning due to such deformation of light guide plate 213, it is conceivable that mold frame 230 is more firmly fixed to rear frame 220. However, the use of such fixed structure takes up the space, thereby preventing the bezel from being narrowed.

The present disclosure is based on such knowledge, and as a result of conducting in-depth study, the inventors of the present application came up with the idea of a structure of an image display device which is capable of reducing the occurrence of light leakage by preventing a mold frame from turning while not preventing a bezel from being narrowed.

Hereinafter, embodiments will be described with reference to the drawings as appropriate. However, unnecessarily detailed descriptions may be omitted. For example, detailed descriptions on items already widely known and redundant descriptions regarding substantially the same configurations may be omitted. The purpose of the omission is to avoid unnecessary redundancy in the following descriptions, and to make the following descriptions readily understood by a person skilled in the art. In addition, the embodiments and the claims use expressions which indicate an orientation or a position of one or more objects, such as parallel, orthogonal, and uniformly spaced; however, these expressions include the case in which the one or more objects are not strictly facing the orientation or in the position. For example, the expression, parallel, not only indicates that things are perfectly in parallel with each other, but also indicates that the things are substantially parallel with each other. That is to say, the expression includes a difference of about several percent. The same applies to expressions, such as the same or uniform, which indicate the relation of two or more items of information or the relation of two or more objects.

Note that the drawings and the following description are provided in order that a person skilled in the art sufficiently understands the present disclosure, and thus are not intended to limit the subject matter of the claims.

In addition, for the convenience of describing the following embodiments, the Z-axis direction represents the up-down direction, the Y-axis direction represents the front-rear direction, and the X-axis direction represents the left-right direction (lateral direction) in the following embodiments. These associations of directions are not intended to limit the orientation of an image display device according to the present disclosure during the manufacturing processes or at the time of usage. In addition, the positive side of the X-axis indicates the direction at which an arrow of the X-axis is pointing, and the negative side of the X-axis indicates the direction opposite to the positive side of the X-axis. The same applies to the Y-axis direction and the Z-axis direction.

Hereinafter, embodiments will lie described with reference to FIG. through FIG. 7. First, an overview of the configuration of an image display device according to the embodiments will be described with reference to FIG. 1 and FIG. 2.

[11-1. Overall Configuration of Image Display Device]

First, the overall configuration of image display device 2 according to the embodiment will be described with reference to FIG. 1 and FIG. 2.

Figure 1:
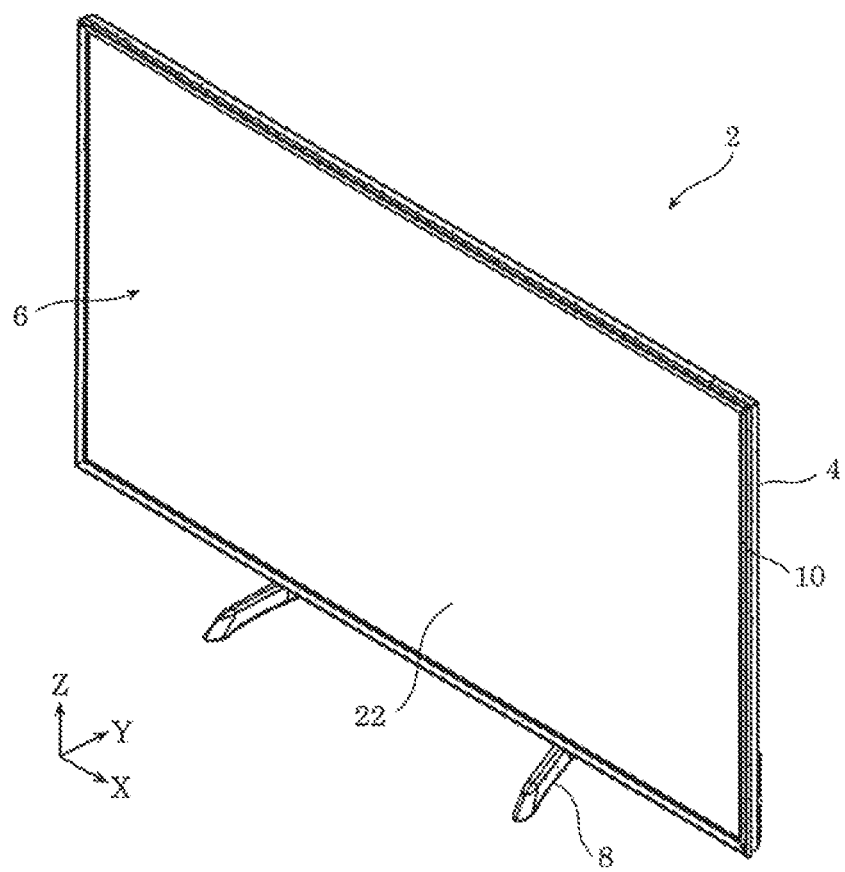
FIG. 1 is a perspective view illustrating a front face side of an image display device according to an embodiment.

FIG. 1 is a perspective view illustrating a front face side of image display device 2 according to an embodiment. FIG. 2 is an exploded perspective view illustrating display unit 6 of image display device 2 according to the embodiment.

As illustrated in FIG. 1, image display device 2 is a flat-panel display type liquid crystal television receiver, for example. Image display device 2 is provided with case 4, display unit 6 that is disposed inside of case 4, and stand 8 that supports case 4.

As illustrated in FIG. 1, case 4 includes bezel 10 as a front cabinet, and a rear cabinet (not shown in the drawings). Bezel 10 has the shape of a quadrilateral frame, and covers the periphery of liquid crystal cell 22 from the front face side of image display device 2. The rear cabinet covers rear frame 12 from the rear face side of image display device 2, and is connected with bezel 10.

Figure 2:
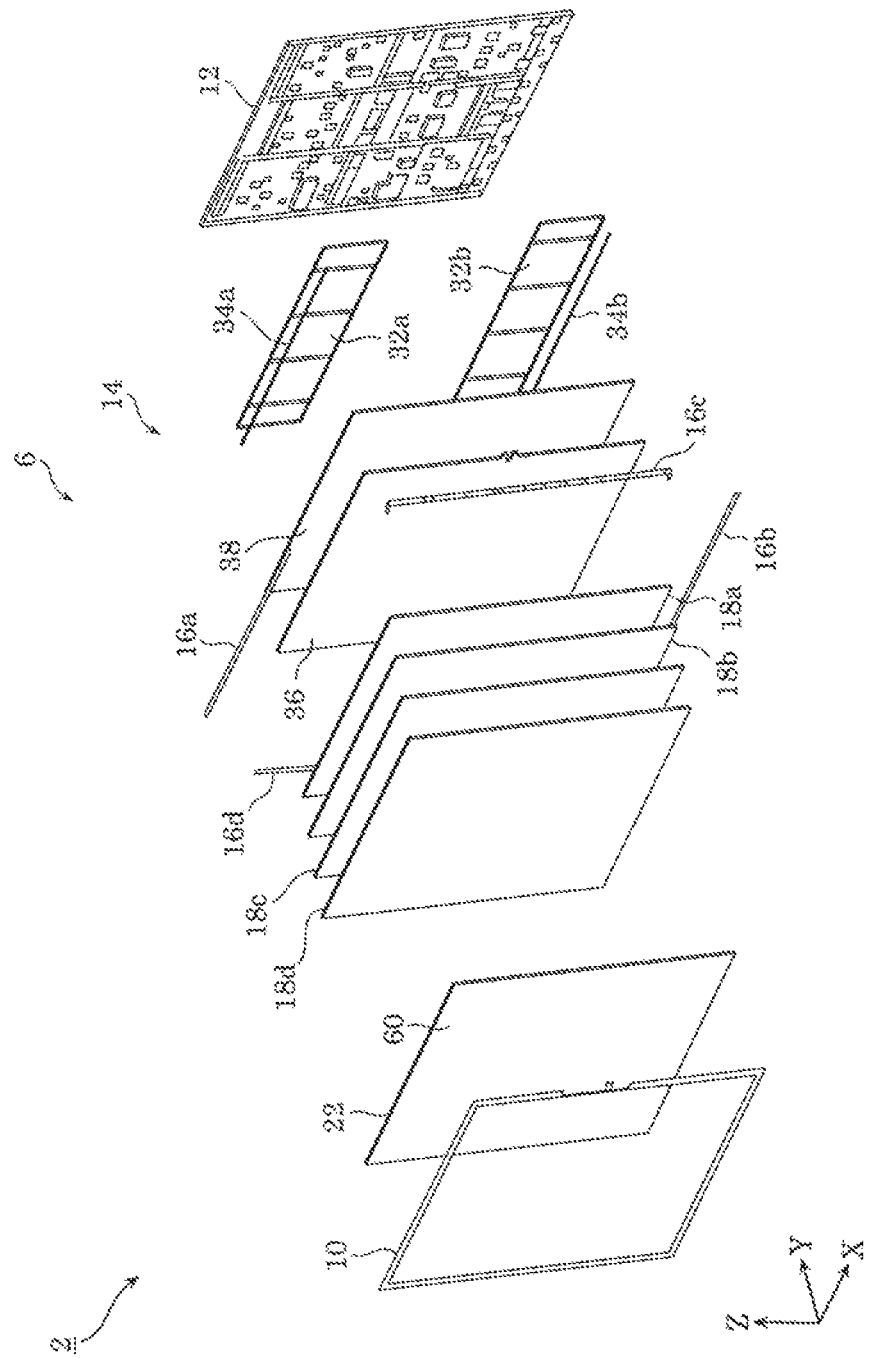
FIG. 2 is an exploded perspective view illustrating a display unit of the image display device according to the embodiment.

As illustrated in FIG. 2, display unit 6 is provided with rear frame 12, backlight unit 14, a plurality of mold frames 16a, 16b, 16c, and 16d (16a through 16d), a plurality of optical sheets 18a, 18b, 18c, and 18d (18a through 18d), and liquid crystal cell 22 (an example of a display panel).

Rear frame 12 is a metal base plate for supporting backlight unit 14 from the rear face side of image display device 2. Rear frame 12 includes a bumpy portion for improving rigidity of rear frame 12, and a plurality of screw holes for fixing various kinds of components to rear frame 12.

Backlight unit 14 is an edge light type backlight device in the embodiment. Backlight unit 14 includes heat sinks 32a and 32b, LED bars 34a and 34b, light guide plate 36, and reflection sheet 38.

Heat sinks 32a and 32b each include metal with high thermal conductivity; such as aluminum. LED bars 34a and 34b each are an example of a light source portion, and include a plurality of light emitting elements 341 (see FIG. 3). Each of the plurality of light emitting elements 341 is an LED element in which an LED chip is packaged, for example. In addition, the LED bars (34a and 34b) are disposed at both the top and the bottom of light guide plate 36. Specifically, LED bar 34a is disposed on the upper side of light guide plate 36 (the positive side of the Z-axis), and LED bar 34b is disposed on the lower side of light guide plate 36 (the negative side of the Z-axis).

LED bar 34a is attached to heat sink 32a using, for example, an adhesive double-sided tape with high thermal conductivity, and LED bar 34b is attached to heat sink 3b using, for example, an adhesive double-sided tape with high thermal conductivity. Heat sinks 32a and 3b are fixed to rear frame 12 with a plurality of screws, and thus LED bars 34a and 34b are also fixed to rear frame 12.

Light guide plate 36 is formed in the shape of a quadrilateral plate in a planar view. Light guide plate 36 is supported by rear frame 12. Light guide plate 36 is an injection molded acrylic resin, for example. The upper end face of light guide plate 36 is disposed facing LED bar 34a. Light from the plurality of LED elements in LED bar 34a enter light guide plate 36 from the upper end face of light guide plate 36. In addition, the lower end face of light guide plate 36 is disposed facing LED bar 34b. Light from the plurality of light emitting elements 341 in LED bar 34b enter light guide plate 36 from the lower end face of light guide plate 36.

Reflection sheet 38 covers the rear face of light guide plate 36. Reflection sheet 38 reflects, frontward, light that has entered from both the upper end face and the lower end face of light guide plate 36. Light reflected by reflection sheet 38 exits from the front face of light guide plate 36, and enters liquid crystal cell 22 from the rear face (the face opposite display surface 60 which will be described later).

As illustrated in FIG. 2, the plurality of mold frames 16a through 16d are frames which include resin and have an elongated shape. It is to be noted that mold frames 16a through 16d which include resin are exemplified as an example of a frame here, but the frame may include metal.

The plurality of mold frames 16a, 16b, 16c, and 16d are attached to the upper end portion, the lower end portion, the right end portion (the end portion on the positive side of the X-axis), and the left end portion (the end portion on the negative side of the X-axis) of rear frame 12, respectively. That is to say, the plurality of mold frames 16a through 16d are disposed along the periphery of light guide plate 36 in the shape of a quadrilateral frame. The plurality of mold frames 16a through 16d are disposed so as to hold the periphery of light guide plate 36 from the front face of light guide plate 36 via cushion member 190 (see FIG. 3).

As illustrated in FIG. 2, the plurality of optical sheets 18a, 18b, 18c, and 18d are disposed next to one another in the stated order between liquid crystal cell 22 and light guide plate 36. Optical sheet 18a is a diffusion sheet for diffusing light that has exited from the front face of light guide plate 36. Optical sheets 18b and 18c are prism sheets for condensing, on the rear face of liquid crystal cell 22, the light that has exited from the front face of light guide plate 36. Optical sheet 18d is a reflective polarization sheet (the so-called dual brightness enhancement film (DBEF) sheet) for polarizing the light that has exited from the front face of light guide plate 36. The upper end portions (periphery) of the plurality of optical sheets 18a through 18d are supported by mold frame 16a, and the lower end portions (periphery) of the plurality of optical sheets 18a through 18d are supported by mold frame 16b.

Liquid crystal cell 22 is formed in the shape of a quadrilateral plate in a planar view. The front face of liquid crystal cell 22 includes display surface 60 for displaying an image. The periphery of liquid crystal cell 22 is supported by the plurality of mold frames 16a through 16d via cushion member 190.

Bezel 10 is formed in the shape of a quadrilateral frame, and is disposed so as to cover the periphery of display surface 60 of liquid crystal cell 22. Bezel 10 is attached to rear frame 12 with screw 150 (see FIG. 3), for example.

[1-2. Upper Structure of Image Display Device]

Figure 3:
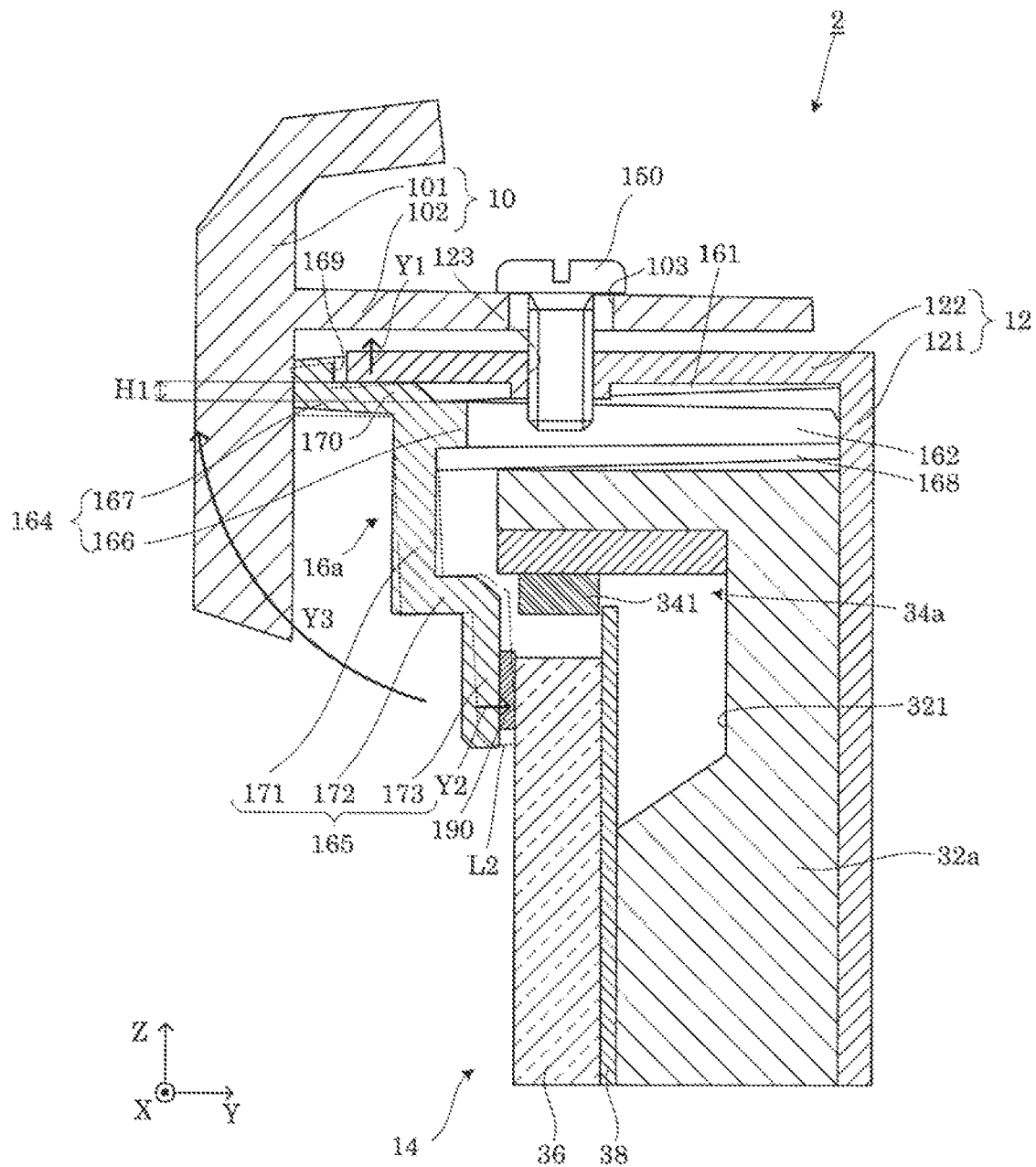
FIG. 3 is a cross sectional view illustrating an upper structure of the image display device according to the embodiment.

Next, the upper structure of image display device 2 will be described in detail. FIG. 3 is a cross sectional view illustrating the upper structure of image display device 2 according to the embodiment. In FIG. 3, the plurality of optical sheets 18a, 18b, 18c, and 18d, and liquid crystal cell 22 are not illustrated.

As illustrated in FIG. 3, rear frame 12 is provided with rear plate 121 having a quadrilateral shape in a planar view, and upper wall portion 122 extending frontward from the upper end portion of rear plate 121. On the upper portion of rear plate 121, heat sink 32a is fixed spaced apart from upper wall portion 122. On the front face of heat sink 32a, light guide plate 36 is attached via reflection sheet 38. Recessed portion 321 is provided on the upper front side of heat sink 32a. In recessed portion 321, LED bar 34a is attached such that light from light emitting element 341 enters from the upper end face that is an end face of light guide plate 36.

Upper wall portion 122 is an example of a wall portion of rear frame 12. Although not illustrated, rear frame 12 includes other wall portions such as a lower wall portion provided at the lower end portion of rear plate 121, a left wall portion provided at the left end portion of rear plate 121, and a right wall portion provided at the right end portion of rear plate 121, for example.

Upper wall portion 122 includes screw hole 123 that penetrates upper wall portion 122 in the up-down direction. Bezel 10 is fastened with a screw which is screwed into screw hole 123. Bezel 10 is provided with upper cover 101 which covers the upper end portion of mold frame 16a and the upper end portion of liquid crystal cell 22 from the front of display device 2, and fixed piece 102 which extends rearward from the rear face of upper cover 101. Upper cover 101 is long in the left-right direction, and fixed piece 102 is also long along the entirety of upper cover 101. Fixed piece 102 is disposed above upper wall portion 122 of rear frame 12. Fixed piece 102 includes through hole 103 coaxially disposed with screw hole 123 in rear frame 12. Bezel 10 is fixed to rear frame 12 with screw 150 screwed into screw hole 123 via through hole 103.

Figure 4:
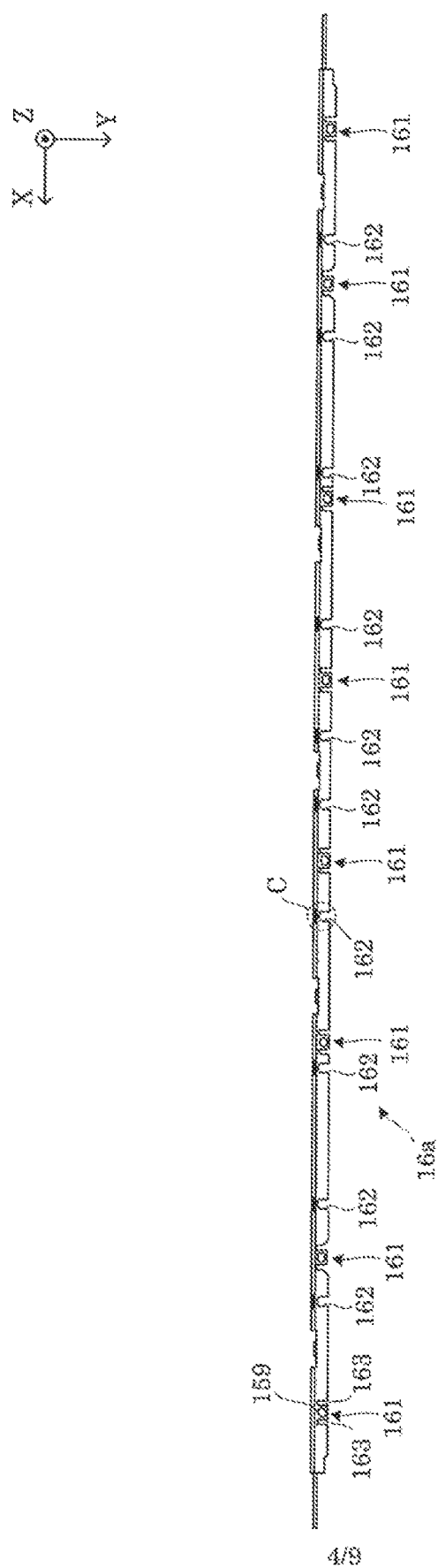
FIG. 4 is a top view illustrating the entirety of a mold frame according to the embodiment.

Next, the structure of mold frame 16a which is disposed at the upper portion of image display device 2 will be described in detail. FIG. 4 is a top view illustrating the entirety of mold frame 16a according to the embodiment. As illustrated in FIG. 4, mold frame 16a is a component that is long in the left-right direction. Mold frame 16a includes a plurality of engagement portions 161 to be engaged with rear frame 12, and a plurality of notches 162 for avoiding interference with screw 150. The plurality of engagement portions 161 and the plurality of notches 162 are disposed spaced apart at fixed intervals in the longitudinal direction. Specifically, mold frame 16a includes eight engagement portions 161, and ten notches 162. Mold frame 16a includes slit 163 on each side of engage portion 161. Slit 163 allows engagement portion 161 to readily bend. Engagement portion 161 includes engagement hole 159 onto which a portion of rear frame 12 is hooked. In order to attach mold frame 16a to rear frame 12, engagement portion 161 is bent to hook the portion of rear frame 12 onto engagement hole 159 so that engagement portion 161 is engaged with rear frame 12.

Figure 5:
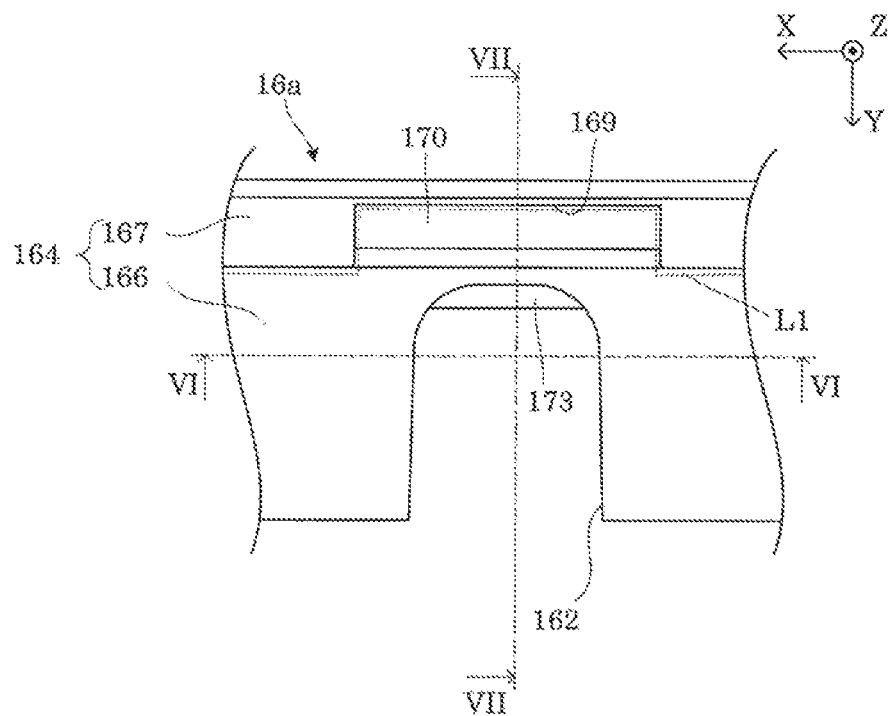
FIG. 5 is an enlarged view illustrating a portion in the mold frame in FIG. 4.
Figure 6:
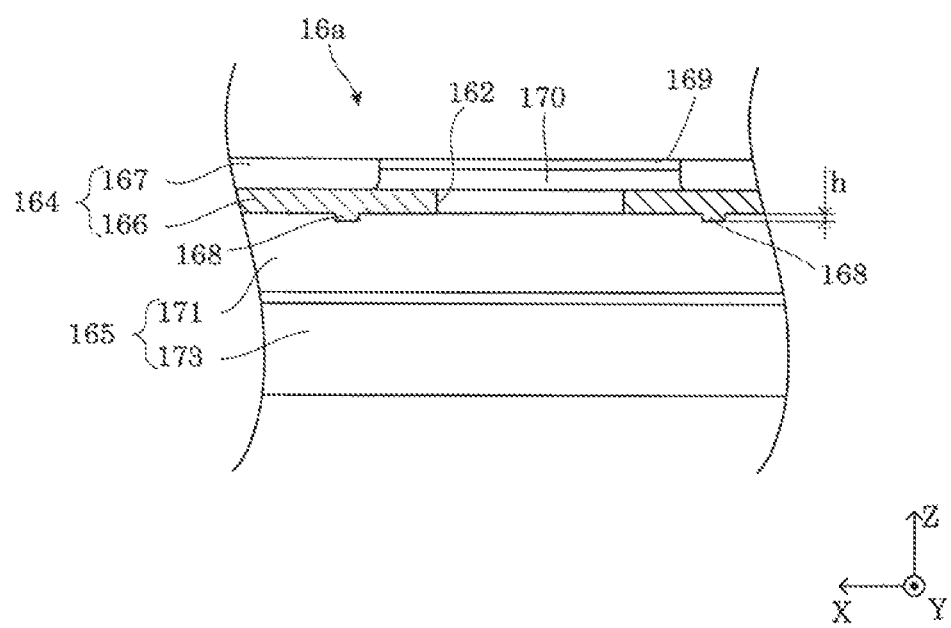
FIG. 6 is a cross sectional view illustrating the mold frame taken along the line VI-VI in FIG. 5.

FIG. 5 is an enlarged view illustrating a portion inside of circle C in mold frame 16a in FIG. 4. FIG. 6 is a cross sectional view illustrating mold frame 16a taken along the line VI-VI in FIG. 5. FIG. 7 is a cross sectional view illustrating mold frame 16a taken along the line VII-VII in FIG. 5.

Figure 7:
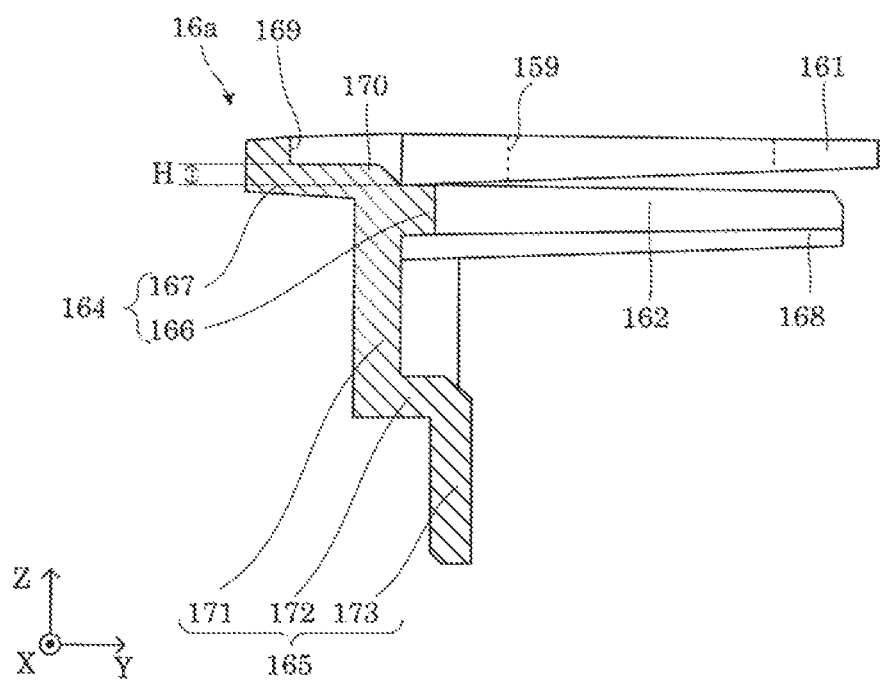
FIG. 7 is a cross sectional view illustrating the mold frame taken along the line in FIG. 5.

As illustrated in FIG. 5 through FIG. 7, mold frame 16a integrally includes main body 164, and holder 165 which extends downward from the middle position in the front-rear direction of main body 164. Main body 164 is disposed inwardly of, and along upper wall portion 122. Specifically, main body 164 includes rear portion 166 which is disposed behind holder 165, and front portion 167 which is disposed in front of holder 165.

Rear portion 166 is located below engagement portion 161. In addition, rear portion 166 includes notch 162 which is long in the front-rear direction and has an open rear end portion. A pair of ribs 168 is formed on the bottom face of rear portion 166 so as to sandwich notch 162. Rib 168 is an example of a second protrusion, and is a protrusion long in the front-rear direction. It is to be noted that although not illustrated, a plurality of ribs are disposed spaced apart at fixed intervals in the left-right direction, other than near notch 162. However, protrusion amount h by which rib 168 protrudes and which is disposed near notch 162 is greater than the protrusion amount of the other ribs. This enables rib 168 to reinforce a portion which is fragile due to the presence of notch 162.

In front portion 167, recessed portion 169 is formed in a position corresponding to notch 162. Broken line L1 in FIG. 5 illustrates the outside shape of upper wall portion 122. Upper wall portion 122 includes a portion that has a protruding shape protruding frontward, and is disposed inside of recessed portion 169. In recessed portion 169 in front portion 167, or in other words, in a position facing the portion in upper wall portion 122, first protrusion 170 which protrudes toward the portion is provided. That is to say, first protrusion 170 protrudes above the top face of rear portion 166. First protrusion 170 protrudes from the top face of rear portion 166 by protrusion amount H.

From main body 164, holder 165 extends in the shape of a crank. Specifically, main body 164 includes: base portion 171 which extends downward from main body 164; intermediate portion 172 which extends rearward from an end of base portion 171; and end portion 173 which extends downward from an end of intermediate portion 172. Accordingly, end portion 173 is disposed behind base portion 171. Cushion member 190 (see FIG. 3) in the shape of a sheet is attached to the rear face of end portion 173.

When mold frame 16a is attached to rear frame 12 as illustrated in FIG. 3, rear portion 166 of main body 164 is disposed below upper wall portion 122, and between upper wall portion 122 and heat sink 32a. That is to say, heat sink 32a is disposed on a side opposite a side of rear portion 166 facing upper wall portion 122. In addition, rib 168 below rear portion 166 is in contact with the upper end portion of heat sink 32a.

Meanwhile, an end portion of upper wall portion 122 is disposed inside of recessed portion 169 in front portion 167. Accordingly, first protrusion 170 in recessed portion 169 is in contact with the end portion of upper wall portion 122. Here, protrusion amount H by which first protrusion 170 protrudes is greater than space H1 between rear portion 166 and upper wall portion 122 in the direction in which rear portion 166 and upper wall portion 122 are aligned (the Z-axis direction). When first protrusion 170 and the end portion of upper wall portion 122 are in contact with each other, the end portion presses first protrusion 170, and thus a downward force is applied to front portion 167. For example, broken line L2 in FIG. 3 illustrates a state of mold frame 16a when there is no light guide plate 36. As broken line L2 illustrates, when upper wall portion 122 presses first protrusion 170, holder 165 turns and inclines rearward when there is no light guide plate 36. Due to the inclination, end portion 173 of holder 165 will be located rearward compared with the state in which end portion 173 holds light guide plate 36. It is to be noted that since an end of rear portion 166 is in contact with rear plate 121 of rear frame 12, holder 165 inclines using the end of rear portion as the fulcrum.

Actually, end portion 173 of holder 165 holds the upper end portion of light guide plate 36 via cushion member 190 from the front of light guide plate 36. The inclination of holder 165 is eventually corrected because holder 165 receives a reaction force from light guide plate 36. That is to say, the entirety of mold frame 16a elastically deforms, and is redisposed in a normal position. In this state, upper wall portion 122 restricts first protrusion 170 to move upward, and the upper end portion of light guide plate 36 restricts holder 165 to move rearward. Accordingly, an elastic restoring force produced by mold frame 16a acts on upper wall portion 122 and the upper end portion of light guide plate 36. Specifically, an upward force (arrow Y1 in FIG. 3) acts on upper wall portion 122, and a rearward force (arrow Y2 in FIG. 3) acts on the upper end portion of light guide plate 36. This prevents the deformation of the upper end portion of light guide plate 36 as a result of receiving the rearward force from holder 165, although the upper end portion of light guide plate 36 may bend frontward under an influence of heat, for example. Therefore, it is possible to prevent the turn (arrow Y3 in FIG. 3) of mold frame 16a due to the deformation of light guide plate 36. In addition, prevention of the deformation of the upper end portion of light guide plate 36 keeps light guide plate 36 and reflection sheet 38 in contact with each other. In other words, light guide plate 36 and reflection sheet 38 are not readily spaced apart, thereby preventing an occurrence of light leakage from a space between light guide plate 36 and reflection sheet 38.

It is to be noted that since rib 168 below rear portion 166 is in contact with the upper end portion of heat sink 32a, the turn of mold frame 16a can be more reliably restricted by rib 168. As such, rib 168 can also stably hold mold frame 16a in the normal position, and can more reliably prevent the deformation of the upper end portion of light guide plate 36.

[1-3. Effect, etc.]

As has been described above, image display device 2 according to the embodiment includes: a light source portion (LED bar 34a); light guide plate 36 in a shape of a quadrilateral which includes an end face from which light emitted from the light source portion enters and an front face from which the light exits; heat sink 32a that holds the light source portion and light guide plate 36; a base plate (rear frame 12) which accommodates the light source portion, light guide plate 36, and heat sink 32a; and a frame (mold frame 16a) that holds light guide plate 36 from front of light guide plate 36 in a state in which the frame is fixed to a wall portion (upper wall portion 122) of rear frame 12. Mold frame 16a includes: main body 164 disposed inwardly of and along the wall portion; and holder 165 extending from main body 164. Holder 165 holds an end portion (upper end portion) of light guide plate 36 from the front of light guide plate 36. The end portion is on a side of the end face from which light emitted from the light source portion enters. Holder 165 presses the end portion of the light guide plate in the elastically deformed state.

Accordingly, since holder 165 presses the end portion of light guide plate 36 in the elastically deformed state, an elastic restoring force produced by holder 165 acts on the upper end portion of light guide plate 36. This presses the upper end portion of light guide plate 36 rearward, thereby preventing the deformation of light guide plate 36. Therefore, it is possible to prevent the turn of mold frame 16a due to the deformation of light guide plate 36, and thereby prevents an occurrence of light leakage.

With such mold frame 16a, the turn of mold frame 16a can be prevented without separately using a fixed structure for firmly fixing mold frame 16a. That is to say, since a setting space for the fixed structure need not be provided, bezel 10 is not prevented from being narrowed.

In addition, main body 164 includes front portion 167 in which first protrusion 170 faces the wall portion (upper wall portion 122). Front portion 167 is in front of holder 165. Protrusion amount H by which first protrusion 170 protrudes is greater than space H1 between rear portion 166 of main body 164 and the wall portion in a direction in which rear portion 166 and the wall portion are aligned. Rear portion 166 is behind holder 165.

Accordingly, since protrusion amount H by which first protrusion 170 protrudes is greater than space H1 between rear portion 166 and upper wall portion 122, first protrusion 170 surely comes into contact with upper wall portion 122. When first protrusion 170 and upper wall portion 122 are in contact with each other, upper wall portion 122 presses first protrusion 170, and a downward force is applied to front portion 167. That is to say, since a force in a direction opposite the arrow Y3 direction acts on mold frame 16a, holder 165 inclines rearward and holds the upper end portion of light guide plate 36 rearward. This makes it possible to prevent the deformation of the upper end portion of light guide plate 36.

In addition, even if a force produced due to the deformation of the upper end portion of light guide plate 36 acts on holder 165, it is possible to reliably control the turn of mold frame 16a in the arrow Y3 direction, since first protrusion 170 and upper wall portion 122 are in contact with each other.

Furthermore, first protrusion 170 is provided in a position corresponding to notch 162 provided in rear portion 166.

As has been described above, a portion in mold frame 16a where notch 162 is present is more fragile than the other portions in mold frame 16a. That is to say, a portion near notch 162 in mold frame 16a is likely to be deformed compared with the other portions in mold frame 16a. When first protrusion 170 is provided in the position corresponding to notch 162, it is possible to control a portion which is likely to be deformed and to reliably prevent the deformation of the portion. Therefore, holder 165 of mold frame 16a can more firmly press the upper end portion of light guide plate 36, and can reliably prevent the deformation of light guide plate 36.

In addition, heat sink 32a is disposed on a side opposite a side of rear portion 166 facing the wall portion (upper wall portion 122), and main body 164 includes a second protrusion (rib 168) below a surface of rear portion 166 facing heat sink 32a.

This enables rib 168 to come into contact with the upper end portion of heat sink 32a. When rib 168 and the upper end portion of heat sink 32a are in contact with each other, it is possible for rib 168 to more reliably control the turn of mold frame 16a.

Furthermore, the second protrusion (rib 168) is provided near notch 162 provided in rear portion 166.

As has been described above, a portion near notch 162 in mold frame 16a is likely to be deformed compared with the other portions in mold frame 16a. When rib 168 is provided near notch 162, it is possible to control a portion which is likely to be deformed and to reliably prevent the deformation of the portion. Therefore, holder 165 of mold frame 16a can more firmly press the upper end portion of light guide plate 36, and can reliably prevent the deformation of light guide plate 36.

[2-1. Variation 1]

The above embodiment has exemplified the case in which the provision of first protrusion 170 in mold frame 16a enables holder 165 to press the upper end portion of light guide plate 36. However, so long as holder 165 is capable of pressing the upper end portion of light guide plate 36, mold frame 16a may be configured in any way. Variation 1 describes the case in which holder 165 presses the upper end portion of light guide plate 36 using a first protrusion provided in upper wall portion 122 of rear frame 12.

Figure 8:
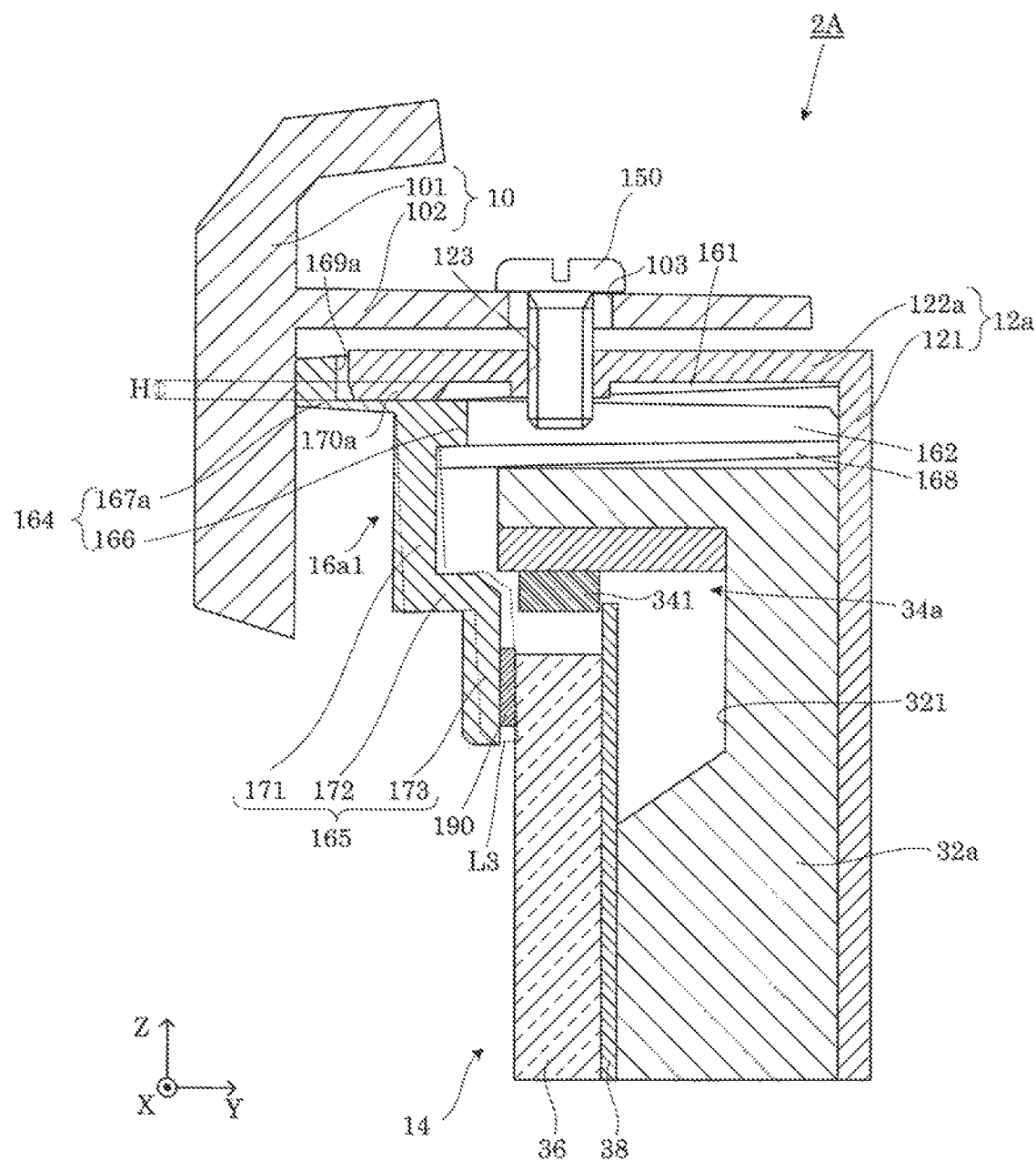
FIG. 8 is a cross sectional view illustrating an upper structure of an image display device according to Variation 1.

FIG. 8 is a cross sectional view illustrating an upper structure of image display device 2A according to Variation 1. Specifically, FIG. 8 is a diagram that corresponds to FIG. 3. Hereinafter, it is to be noted that the same reference signs are given to elements that are identical with the elements described in the above embodiment, and redundant descriptions may be omitted.

As illustrated in FIG. 8, the inside of recessed portion 169a in mold frame 16a1 is not protruded, and the inside of recessed portion 169a is substantially flush with the top face of rear portion 166. Meanwhile, a portion of upper wall portion 122a of rear frame 12a is disposed inside of recessed portion 169a. In a position facing the portion of upper wall portion 122a in recessed portion 169a, first protrusion 170a is provided. First protrusion 170a protrudes more compared with the other portions in upper wall portion 122a. First protrusion 170a is protruding by protrusion amount H from the bottom face of upper wall portion 122a. Protrusion amount H is greater than space H1. Accordingly first protrusion 170a presses front portion 167a, and a downward force is applied to front portion 167a. Thus, when first protrusion 170a presses front portion 167a, holder 165 turns and inclines rearward. Broken line L3 in FIG. 8 illustrates a state of holder 165 without light guide plate 36. Due to the inclination, end portion 173 of holder 165 will be located rearward compared with the state in which end portion 173 holds light guide plate 36. That is to say, when holder 165 is holding the upper end portion of light guide plate 36, holder 165 is in the elastically deformed state due to a reaction force from light guide plate 36. Meanwhile, a press force caused by an elastic restoring force which is produced by holder 165 acts on the upper end portion of light guide plate 36, thereby preventing the deformation of light guide plate 36.

It is to be noted that a first protrusion may be divided to be provided for a mold frame and a rear frame. Specifically, first protrusions are provided butted up against each other, each in the front portion of the mold frame and the upper wall portion of the rear frame. In this case, a value obtained by combining the protrusion amount by which the first protrusion protrudes on the front portion side and the protrusion amount by which the first protrusion protrudes on the upper wall portion side is to be greater than space H1.

[2-2. Variation 2]

Variation 2 describes the case in which a holder that is located behind the predetermined normal position presses the upper end portion of light guide plate 36 after assembly.

Figure 9:
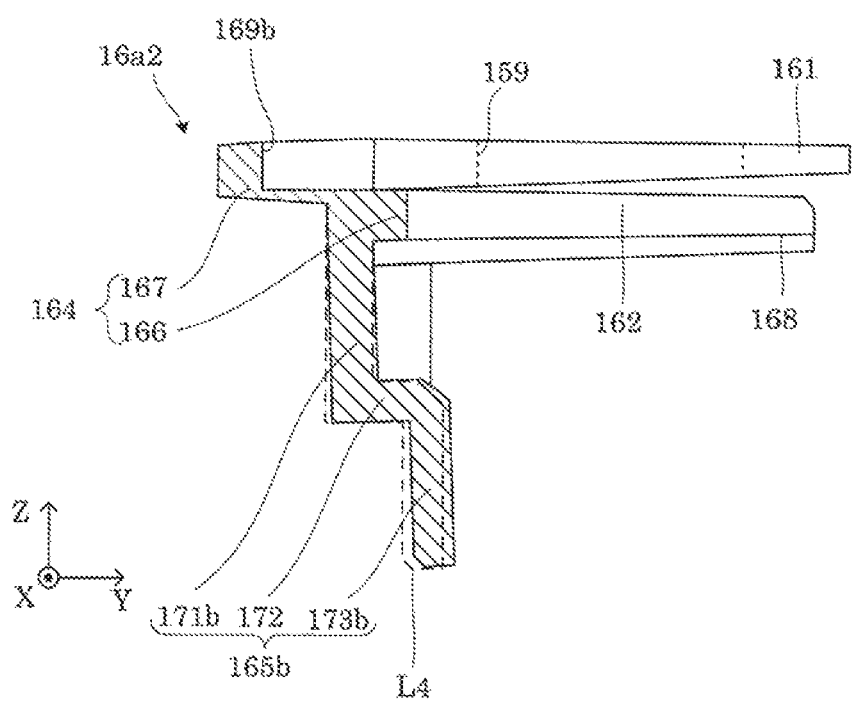
FIG. 9 is a cross sectional view illustrating a mold frame according to Variation 2.

FIG. 9 is a cross sectional view illustrating mold frame 16a2 according to Variation 2. Specifically, FIG. 9 is a diagram that corresponds with FIG. 7.

As illustrated in FIG. 9, the inside of recessed portion 169b in mold frame 16a2 is not protruded, and the inside of recessed portion 169b is substantially flush with the top face of rear portion 166. Here, broken line L4 in FIG. 9 illustrates the installation position of holder 165b after assembly. This installation position is the normal position of holder 165b. Before the assembly, holder 165b is located behind the normal position. Specifically, base portion 171b of holder 165b inclines relative to the up-down direction such that base portion 171b of holder 165b makes an acute angle with rear portion 166 of main body 164. Accordingly, end portion 173b of holder 165b is located behind the normal position.

After the assembly, end portion 1731 of holder 165b holds the upper end portion of light guide plate 36 via cushion member 190 from the front of light guide plate 36. Holder 165b is disposed in the normal position in the elastically deformed state due to a reaction force from light guide plate 36. In this state, an elastic restoring force produced by mold frame 16a2 acts on the upper end portion of light guide plate 36. This prevents the deformation of the upper end portion of light guide plate 36 as a result of receiving a rearward force from holder 165, although the upper end portion of light guide plate 36 may bend frontward under an influence of heat, for example.

Other Embodiment

The embodiments have been described as above to exemplify technique that is disclosed in the present application. However, the technique disclosed in the present disclosure is not limited to the above embodiments, and is applicable to embodiments to which changes, replacements, additions, omissions, etc. have been suitably made. In addition, it is also possible to combine each of the structural elements described in the above embodiments to come up with other embodiments. Thus, other embodiments will be exemplified as follows.

For example, the above embodiments have exemplified the case in which distinctive configurations according to the present disclosure are used for mold frame 16a that is disposed in the upper portion of image display device 2. However, it is also possible to use the distinctive configurations according to the present disclosure for mold frame 16b disposed at the lower portion of image display device 2, mold frame 16c disposed on the right side of image display device 2, and mold frame 16d disposed on the left side of image display device 2. It is to be noted that when mold frames 16c and 16d, which are disposed on the right side and the left side, respectively, are used, a light source portion is to be placed on each of the left end face and the right end face of light guide plate 36 so that light enters through the left end face and the right end face of light guide plate 36.

In addition, the above embodiments have exemplified, as an example of a second protrusion, rib 168 which is the protrusion long in the front-rear direction. However, so long as the second protrusion can control the turn of mold frame 16a, mold frame 16a can have any other shape. For example, the second protrusion can have the shape of a dot-like projection.

Furthermore, image display device 2 according to the embodiments can be realized as, for example, a liquid crystal television receiver. However, the configuration of image display device 2 may be applied to displays for personal computers and mobile terminals, such as tablet terminals, smartphones, etc., for example.

The above has described the embodiments to exemplify the technique according to the present disclosure. The drawings and detailed descriptions are provided for this purpose.

Therefore, the drawings and the detailed descriptions may include, among the structural elements essential for addressing issues, a structural element which is not essential for addressing the issues. Thus, those non-essential structural elements should not be immediately considered as necessary because they are illustrated in the drawings and described in detail.

In addition, since above embodiments are for exemplifying the technique according to the present disclosure, various changes, replacements, additions, omissions, etc. can be made in the claims and in other equivalent areas.

INDUSTRIAL APPLICABILITY

The present disclosure is applicable to an image display device for displaying an image. Specifically, the present disclosure is applicable to a television receiver, a display, digital signage, a tablet terminal, a smartphone, and a table-type display device.

REFERENCE MARKS IN THE DRAWINGS 2, 2A image display device
4 case
6 display unit
8 stand
10 bezel
12, 12a rear frame (base plate)
14 backlight unit
16a, 16b, 16c, 16d, 16a1, 16a2 mold frame (frame)
18a, 18b, 18c, 18d optical sheet
22 liquid crystal cell
32a heat sink
32b heat sink
34a, 34b LED bar (light source portion)
36 light guide plate
38 reflection sheet
60 display surface
101 upper cover
102 fixed piece
103 through hole
121 rear plate
122, 122a upper wall portion
123 screw hole
150 screw
159 engagement hole
161 engagement portion
162 notch
163 slit
164 main body
165, 165b holder
166 rear portion
167, 167a front portion
168 rib (second protrusion)

169, 169a, 169b, 321 recessed portion
170, 170a first protrusion
171, 171b base portion
172 intermediate portion
173, 173b end portion
190 cushion member
341 light emitting element
h, H protrusion amount
H1 space

The invention claimed is:

1. An image display device, comprising:
a light source portion;
a light guide plate in a shape of a quadrilateral, the light guide plate including an end face from which light emitted from the light source portion enters and an front face from which the light exits;
a heat sink that holds the light source portion and the light guide plate;
a base plate which accommodates the light source portion, the light guide plate, and the heat sink; and
a frame that holds the light guide plate at the front face of the light guide plate in a state in which the frame is fixed to a wall portion of the base plate, wherein
the frame includes:
  a main body including a front face and a rear face opposite to the front face and disposed inwardly of and along the wall portion, the rear face facing the wall portion; and
  a holder extending from the front face of the main body, the holder holding an end portion of the light guide plate at the front face of the light guide plate, the end portion being on a side of the end face from which light emitted from the light source portion enters,
the main body includes a first protrusion protruding from the rear face of the main body and contacting the wall portion, and
a protrusion amount of the first protrusion from the rear face is equal to or greater than a space between the rear face of the main body and the wall portion in a direction in which the rear face of the main body and the wall portion are aligned.

2. The image display device according to claim 1, wherein:
the holder includes a notch extending from a bottom side of the holder toward a top side of the holder, and
the first protrusion is provided between the top side of the holder and a top of the notch.

3. The image display device according to claim 1, wherein
the heat sink is disposed facing the front face of the main body, and
the main body includes a second protrusion protruding from the front face of the main body and contacting a side face of the heat sink.

4. The image display device according to claim 3, wherein the second protrusion comprises a pair of protrusions, between which the notch is provided.

5. The image display device according to claim 2, wherein the main body comprises a recess above the notch.

6. The image display device according to claim 5, wherein a part of the recess overhangs an edge of the wall portion.

* * * * *